United States Patent [19]

Habelt et al.

[11] Patent Number: 4,491,854

[45] Date of Patent: Jan. 1, 1985

[54] PRINTER WITH A GUIDE RULER FOR FLATTENING A RECORD CARRIER

[75] Inventors: Gerhard Habelt; Franz Mucha, both of Vienna, Austria

[73] Assignee: U.S. Philips Corporation, New York, N.Y.

[21] Appl. No.: 403,173

[22] Filed: Jul. 29, 1982

[51] Int. Cl.³ .............................................. G01D 15/24
[52] U.S. Cl. ..................................... 346/136; 400/434
[58] Field of Search ...................... 400/434, 637.6, 641; 346/136, 138

[56] References Cited

U.S. PATENT DOCUMENTS

| | | | |
|---|---|---|---|
| 1,182,352 | 5/1916 | Corcoran | 400/637.6 |
| 1,235,334 | 7/1917 | Landis | 346/136 |
| 1,332,263 | 3/1920 | Kurowski | 400/637.6 |
| 2,432,967 | 12/1947 | Johnson | 400/637.6 |
| 2,889,191 | 11/1954 | Dinsmore | 346/138 |
| 3,717,881 | 2/1973 | Bunning | 346/136 |
| 4,294,556 | 10/1981 | Rix | 400/643 |

Primary Examiner—E. A. Goldberg
Assistant Examiner—M. J. Reinhart
Attorney, Agent, or Firm—David R. Treacy

[57] ABSTRACT

A printer such as an ink jet printer in which a record carrier is fed around a transport roller and over an elongated flat supporting surface extending alongside the roller, with a printing head displaceable along that surface. To cause the carrier to lie flat under the printing head, the surface lies in a plane which is a secant plane with respect to the roller, the secant defining a roller circular segment having a height less than half the roller radius. Between the head and the roller, a ruler presses the record carrier toward but not against the flat surface at that location, causing the carrier to lie flat under the printing head.

5 Claims, 4 Drawing Figures

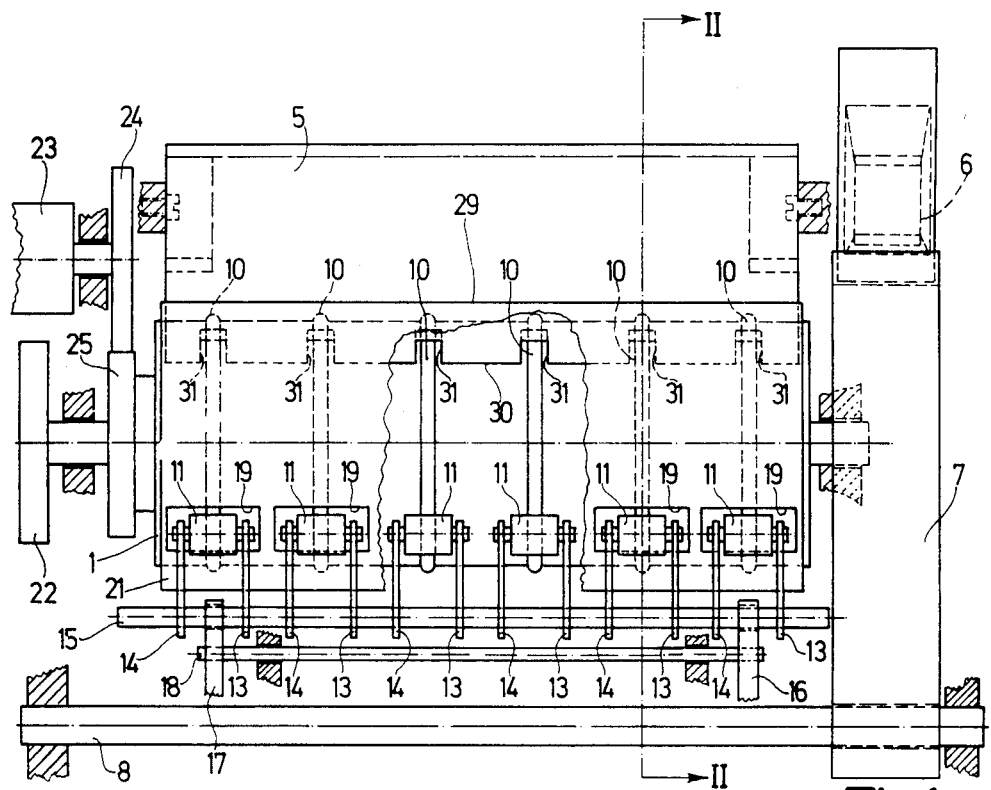
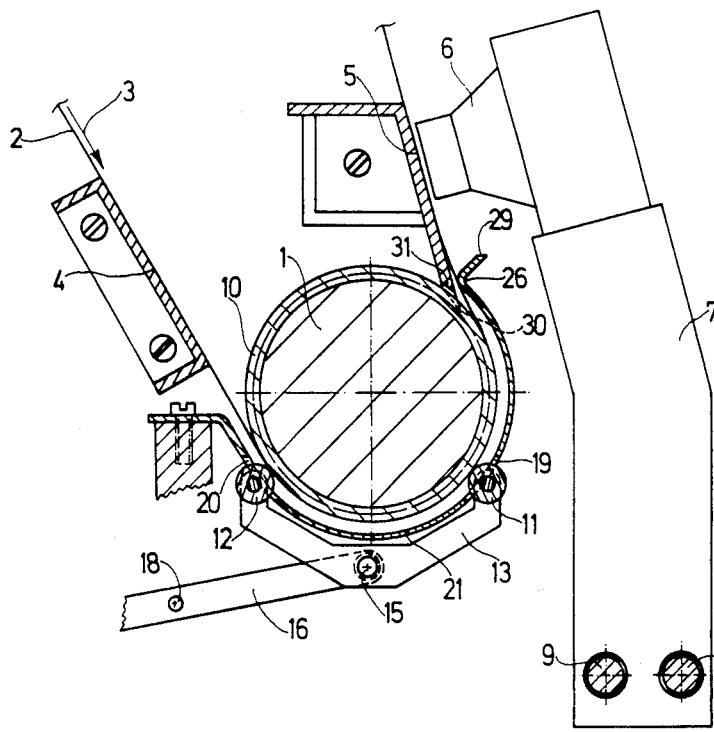

PRINTER WITH A GUIDE RULER FOR FLATTENING A RECORD CARRIER

BACKGROUND OF THE INVENTION

The invention relates to a printer comprising a guide device for transporting a record carrier, by means of a transport roller, to an elongated, flat supporting surface which adjoins the transport roller along one of the surface long sides, viewed in the transport direction of the record carrier, and along which surface a printing head is displaceable. A ruler presses the record carrier away from the face of the printing head before it reaches the area of the printing head. In a printer of this kind which is known, for example, from German Offenlegungsschrift No. 28 29 827, the record carrier should rest as flatly as possible on the supporting surface in order to keep the distance between the record carrier and the printing head as constant as possible; this is important notably when the printing head is an ink jet printing head. In the printer which is known from Offenlegungsschrift No. 28 29 827, to which U.S. Pat. No. 4,294,556 corresponds, the supporting surface tangentially adjoins the transport roller and the record carrier is pressed against the transport roller by means of a member or ruler directly before the separation from the transport roller. It has been found that the record carrier does not rest flatly on the supporting surface in all circumstances in such a guide device.

SUMMARY OF THE INVENTION

It is the object of the invention to improve a printer of the kind described above in order to ensure that the record carrier rests completely and perfectly flatly on the supporting surface. In a printer according to the invention the supporting surface is situated in secant plane which intersects the path of the record carrier around the transport roller, viewed in a cross-sectional view, thereof, so as to define a segment of a circle the rise of arc or height of the segment being smaller than half the radius thereof. The ruler presses against the record carrier at an area opposite the supporting surface without bringing the record carrier directly into contact with the supporting surface. With this arrangement the record carrier becomes S-shaped at the passage from the transport roller to the supporting surface under the influence of the forces acting on the record carrier, and the record carrier subsequently rests completely and perfectly flatly on the supporting surface, so that a constant distance between this surface and the printing head is always ensured.

In a preferred embodiment of the printer in accordance with the invention the transport roller comprises toroidal rings which are spaced apart in the roller longitudinal direction, and which define the path of the record carrier around the transport roller; and the supporting surface includes groove-shaped recesses at its long side which faces the transport roller, these the toroidal rings projecting into and passing through these recesses. The path of the record carrier around the transport roller is thus determined by the toroidal rings, because the record carrier rests on them only. Because the toroidal rings project into the groove-shaped recesses in the supporting surface, the supporting surface adjacent the toroidal rings extends as far as the transport roller, so that at these areas the supporting surface is situated slightly below the path of the record carrier at the carrier's passage from the transport roller to the supporting surface; this has a favorable effect on the formation of a smooth S-curve in the record carrier upon its passage to the supporting surface, so that the flat positioning of the record carrier on the supporting surface is further improved. It is to be noted that transport rollers comprising toroidal rings which are spaced apart in its longitudinal direction are known to be used in commercially available printers. In the above context however, the use of such a transport roller offers the special advantage that the passage of the record carrier from the transport roller to the supporting surface is very smooth.

In view of the simplicity of the construction, the ruler is preferably formed by a bent end of a shell-like cover element which is arranged around the transport roller at a distance therefrom.

The invention will be described in detail hereinafter with reference to the drawings which show two embodiments in accordance with the invention.

BRIEF DESCRIPTION OF THE DRAWING

FIG. 1 is a partly diagrammatic front view of the most relevant parts of a printer comprising a transport roller with toroidal rings.

FIG. 2 is a cross-sectional view of the printer shown in FIG. 1.

DESCRIPTION OF THE PREFERRED EMBODIMENTS

Figure 3:
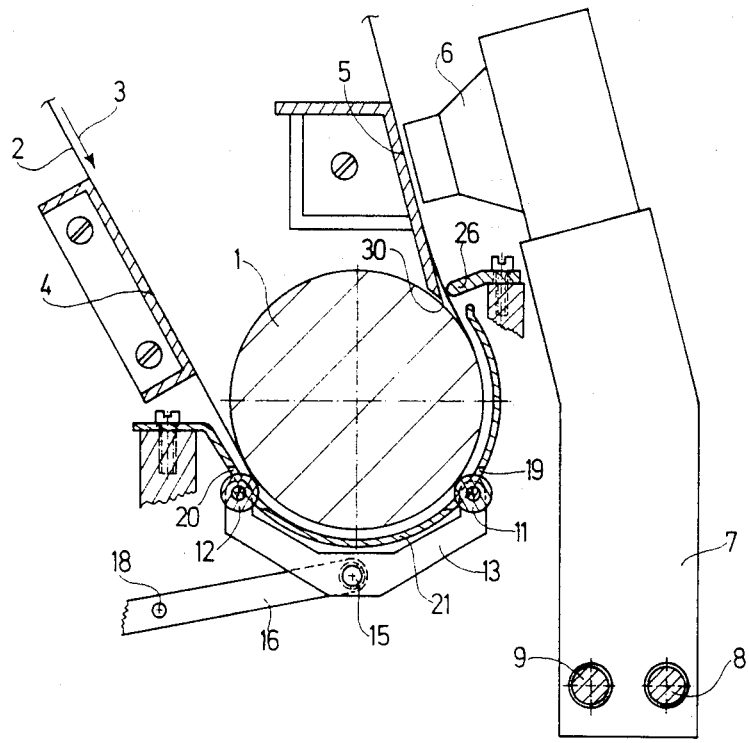
FIG. 3 is a cross-sectional view of a further embodiment comprising a transport roller whose circumferential surface defines the path of a record carrier.

The reference numeral 1 in the FIGS. 1 and 2 denotes an elongated circular cylindrical transport roller which serves for the transport or the line-wise feeding of, for example, a sheet-like record carrier 2 which is shown only in FIG. 2. Viewed in the transport direction of the record carrier (denoted by an arrow 3), the record carrier proceeds from a guide surface 4 to the transport roller 1 and subsequently to a strip-shaped flat supporting surface 5 along which a printing head 6, for example, an ink jet printing head is displaceable. To this end, the printing head 6 is mounted on a carrier 7 which is displaceable in the line direction on two guide rods 8 and 9. The drive for such a displacement of the printing head is not shown herein but may be realized in a customary manner, for example, by means of a motor with a drive belt, a toothed belt or similar.

The transport roller 1 of this embodiment comprises toroidal rings 10 which are spaced apart in its longitudinal direction and which are situated in corresponding grooves; these rings are often also referred to as O-rings. Because the toroidal rings 10 project from the circumferential surface of the transport roller 1, they define the cylindrical path of the record carrier around the transport roller. Two pressure rollers 11 and 12 which are consecutively arranged along the path of the record carrier around the transport roller co-operate with each each of the toroidal rings 10, each of these pressure rollers being journalled on U-shaped supports 13 and 14 which themselves are mounted on a shaft 15. The shaft 15 is supported by two levers 16 and 17 which are pivotable together about a stationary shaft 18, so that the pressure rollers can be pivoted towards and away from the toroidal rings by displacement of the levers 16 and 17. The pressure rollers 11 and 12 then pass through corresponding openings 19 and 20, respectively, which are provided in a shell-like cover element 21 which surrounds the transport roller at a distance, thus forming a guide for the record carrier 2. When the pressure rollers 11 and 12 are lifted off the toroidal rings 10, the record carrier can be slid by hand from the guide surface 4 and around the transport roller 1 until it reaches the supporting surface 5; it can also be pulled out of the printer by hand. However, when the pressure rollers 11 and 12 contact the toroidal rings 10, the record carrier is transported further by rotation of the transport roller. To this end, the transport roller can be rotated either by means of a handwheel 22 connected thereto or by means of a motor 23, via a gearwheel drive with gearwheels 24 and 25.

In a printer of this kind it is very important that the record carrier 2 rests flatly on the supporting surface 5 in order to ensure that its distance from the printing head 6 is always the same, regardless of the position of the head with respect to the record carrier, because printing is correct only when this distance is the same. A constant distance between the printing head and the record carrier is required in several types of printing heads, for example, printing heads of daisy-wheel printers, stylus printers or ink jet printers. Notably in the case of ink jet printers it is important that this requirement is satisfied, because a comparatively small, constant distance between the printing head and the record carrier must be maintained, otherwise the print becomes irregular and incomplete.

In order to ensure that the record carrier rests exactly flat on the supporting surface 5, the supporting surface 5 is situated in a plane which intersects the path of the record carrier 2 around the transport roller 1 in two places, viewed in a cross-sectional view; a ruler member 26 presses the record carrier opposite the area of the supporting surface 5 without bringing the record carrier directly into contact with the supporting surface 5. Thus, at the passage of the record carrier from the path around the transport roller to the supporting surface, the record carrier becomes S-shaped in order to ensure that the record carrier is indeed completely flatly positioned on the surface 5 at the area of the printing head.

Figure 4:
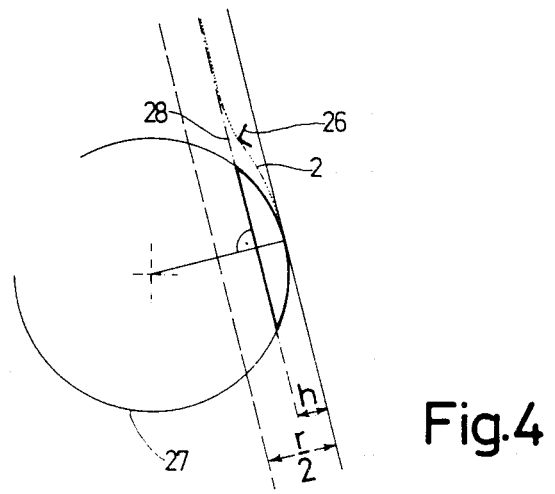
FIG. 4 is a diagrammatic view of the secant plane of the supporting surface which intersects the path of the record carrier around the transport roller to define a segment of a circle.

The segmental intersecting of the path of the record carrier around the transport roller by the plane of the supporting surface is diagrammatically shown in FIG. 4, the arc of circle 27 indicating the path of the record carrier around the transport roller, and the stroke/dot line 28 indicating the plane of the supporting surface. The segment which is defined or cut off is denoted by heavy lines. The position of the ruler 26 is indicated by an angle. It is clearly shown that the dimensions of the segment and the position of the ruler determine the shape of the S-shape of the record carrier 2 at its passage from the path around the transport roller to the plane of the supporting surface. Experiments have demonstrated that in order to ensure suitable flat positioning of the record carrier on the supporting surface, the rise or height h of the segment should preferably be one eighth of the radius r. The required position of the ruler 26 follows from the choice of the dimensions of the segment, because the ruler must be situated at such a distance from the plane 28 of the supporting surface that the record carrier becomes (preferably lightly) S-shaped, without being brought directly into contact with the supporting surface; this is clearly shown in FIG. 4.

In the embodiment shown in the FIGS. 1 and 2, the ruler is simply formed by the bending of the end 29 of the shell-like cover element 21 which is situated near the supporting surface 5, the edge thus bent over performing the function of the ruler. The distance between the ruler 26 and the supporting surface 5 can then be simply adjusted by adjustment of the shell-like cover element.

The FIGS. 1 and 2 also show that at the area of its long side 30 which faces the transport roller 1 the supporting surface 5 comprises groove-like recesses 31 which correspond to the toroidal rings 10 and in which the toroidal rings project. The portions of the supporting surface 5 adjacent the toroidal rings thus reach as far as the transport roller 1, so that at these areas the surface is situated slightly below the path of the record carrier at the passage from the transport roller to the surface. A kind of air cushion is thus formed underneath the record carrier; it has been found that this has a particularly favorable effect for a smooth S-shaped passage from the record carrier to the supporting surface, so that the flat positioning of the record carrier on the supporting surface is further enhanced.

The embodiment shown in FIG. 3 utilizes a transport roller 1 whose entire circumferential surface, for example, formed by a top layer of an elastic material, is used for the transport of the record carrier. Also provided are pressure rollers 11 and 12 which in this case cooperate directly with the circumferential surface of the transport roller 1 and which are adjustable with respect thereto in the same manner as in the embodiment shown in the FIGS. 1 and 2. Similarly, there is provided a shell-like cover element 21 which comprises openings 19 and 20 for the passage of the pressure rollers 11 and 12, respectively. The supporting surface 5 whose long side 30 adjoins the circumferential surface of the transport roller 1 again extends in a plane which segmentally intersects the path of the record carrier around the transport roller, this path being defined by the circumferential surface of the transport roller in this embodiment. In said embodiment a ruler 26 is provided as a separate, strip-shaped component. The free end of the ruler again presses the record carrier opposite the area of the supporting surface 5, without bringing the record carrier directly into contact with the supporting surface.

The choice of the dimensions of the segment cut off from the path of the record carrier around the transport roller by the plane of the supporting surface again determines the distance between the free end of the ruler 26 and the supporting surface 5 so that upon its passage from the transport roller to the supporting surface 5 the record carrier becomes S-shaped as previously described with reference to FIG. 4.

The record carrier 2 is thus absolutely flatly positioned against the supporting surface 5, so that it is ensured that the distance between the printing head 6 and the record carrier is always constant.

Obviously, the steps in accordance with the invention can also be taken for printers having a record carrier transport device of a type other than the described type. For example, in the case of a record carrier comprising edge perforations, a drive with so-called tractors can be provided for this purpose. In such a case the transport roller itself may be formed as a so-called spiked roller.

What is claimed is:

1. A printer comprising:
   an elongated circular cylindrical transport roller for transporting a record carrier about the roller,
   an elongated flat supporting surface, having a long side adjoining said roller,
   a printing head arranged to be displaceable along said surface for printing on a carrier passed between the head and the surface, and
   a member arranged to press the carrier away from said printing head, disposed between the head and the roller,
   characterized in that said surface lies in a plane which is a secant plane with respect to said roller, the intersection of said plane with said roller defining a segment of a circle having a height h less than half the radius r of the circle, and
   the member presses against the record carrier at a location opposite the flat surface arranged so as to cause the carrier to lie flat against the surface at the location of printing without contacting the surface under the member.

2. A printer as claimed in claim 1, characterized in that said height h is approximately one-eighth of the radius r.

3. A printer as claimed in claim 2, characterized in that said roller comprises a plurality of toroidal rings spaced apart in the longitudinal direction of the roller, said rings defining the path of the record carrier around the roller, and
   said supporting surface has a corresponding plurality of recesses in said long side, said rings passing through said recesses.

4. A printer as claimed in claim 1, characterized in that said roller comprises a plurality of toroidal rings spaced apart in the longitudinal direction of the roller, said rings defining the path of the record carrier around the roller, and
   said supporting surface has a corresponding plurality of recesses in said long side, said rings passing through said recesses.

5. A printer as claimed in claim 1, 2, 3 or 4, characterized in that the printer comprises a shell-like cover element arranged around and spaced from the transport roller, said element having a bent end which serves as said member.

* * * * *